United States Patent
Kusala et al.

(10) Patent No.: US 12,203,497 B2
(45) Date of Patent: Jan. 21, 2025

(54) MOUNTING CLIP TO MOUNT AN ACTUATOR UNIT TO A VALVE UNIT AND ASSEMBLY HAVING AN ACTUATOR UNIT, A VALVE UNIT AND A MOUNTING CLIP

(71) Applicant: PITTWAY SARL, Rolle (CH)

(72) Inventors: Petr Kusala, Vyskov (CZ); Jiri Vechet, Brno (CZ); Petr Svejnoha, Vyskov (CZ)

(73) Assignee: PITTWAY SARL, Rolle (CH)

( * ) Notice: Subject to any disclaimer, the term of this patent is extended or adjusted under 35 U.S.C. 154(b) by 29 days.

(21) Appl. No.: 17/996,137

(22) PCT Filed: Apr. 12, 2021

(86) PCT No.: PCT/EP2021/059381
§ 371 (c)(1),
(2) Date: Oct. 13, 2022

(87) PCT Pub. No.: WO2021/209359
PCT Pub. Date: Oct. 21, 2021

(65) Prior Publication Data
US 2023/0139829 A1    May 4, 2023

(30) Foreign Application Priority Data
Apr. 14, 2020 (EP) .................... 20169400

(51) Int. Cl.
*F16B 2/24* (2006.01)
*F16K 27/00* (2006.01)
*F16K 31/00* (2006.01)

(52) U.S. Cl.
CPC .............. *F16B 2/248* (2013.01); *F16K 27/00* (2013.01); *F16K 31/00* (2013.01)

(58) Field of Classification Search
CPC .......... F16B 2/248; F16B 2/245; F16K 27/00; F16K 31/00; F02M 55/025; F02M 55/004;
(Continued)

(56) References Cited

U.S. PATENT DOCUMENTS 4,569,172 A * 2/1986 Weinar ................ E04F 13/0821
52/281
5,581,222 A    12/1996 Pinaud
(Continued)

FOREIGN PATENT DOCUMENTS

DE    10 2017 209 459 B4    12/2018
EP        1008804 A2     6/2000
(Continued)

OTHER PUBLICATIONS

International Search Report in International PCT Application No. PCT/EP2021/059381 mailed Jun. 28, 2021.
https://www.marshall-tufflex.com/wp-content/uploads/2020/03/Firefly-brochure.pdf.

*Primary Examiner* — Craig J Price
(74) *Attorney, Agent, or Firm* — Greenberg Traurig, LLP; Ryan D. Sharp; David J. Dykeman

(57) ABSTRACT

A mounting clip includes a valve unit housing and a flange. The actuator unit has an actuator unit housing and a shoulder. The mounting clip has first sections positioned in first level, that are straight and run parallel to each other within the first level and are configured to be inserted into grooves provided at the shoulder. A second section is positioned in a second level, is U-shaped, and is configured to be inserted into a recess provided at the flange. Third sections extend between each of the first sections and the second section, each of the third sections has first subsections being bent, a second subsection being bent, and a third subsection being straight or angled. The first subsections extend between the (Continued)

first sections and the third subsections. The second subsections extend between the second section and the third sub-sections.

16 Claims, 4 Drawing Sheets

(58) Field of Classification Search
CPC ............. F02M 61/14; F02M 2200/853; F02M 2200/9053; F02M 2200/8023; F02M 2200/856; Y10T 24/44778; Y10T 24/45843; Y10T 24/45838; Y10T 24/45628; H01R 13/6335
USPC .................. 251/291; 24/339; 137/315, 351; 123/470
See application file for complete search history.

(56) References Cited

U.S. PATENT DOCUMENTS

| | | | |
|---|---|---|---|
| 5,901,688 A * | 5/1999 | Balsdon | F02M 35/10222 123/470 |
| 5,909,725 A * | 6/1999 | Balsdon | F02M 35/10222 285/305 |
| 5,970,953 A | 10/1999 | Lorraine et al. | |
| 6,681,458 B2 | 1/2004 | Seymour | |
| 7,802,559 B2 * | 9/2010 | Furst | F02M 61/14 123/470 |
| 8,382,062 B2 * | 2/2013 | Christensen | H01F 7/1607 335/278 |
| 8,632,054 B2 * | 1/2014 | Carlson | F16K 27/00 251/304 |
| 9,109,563 B2 * | 8/2015 | Roseborsky | F02M 61/14 |
| 9,435,303 B2 * | 9/2016 | Yasuda | F02M 61/14 |
| 9,874,187 B2 * | 1/2018 | Kurt | F02M 55/025 |
| 10,094,351 B2 * | 10/2018 | Oh | F02M 61/14 |
| 10,699,832 B2 * | 6/2020 | Wang | F01L 1/3442 |
| 10,914,084 B2 * | 2/2021 | Ubiñana Felix | F16B 2/22 |
| 2012/0199776 A1 | 8/2012 | Kreuter | |
| 2012/0211688 A1 | 8/2012 | Carlson et al. | |
| 2016/0069495 A1 | 3/2016 | Statler, III et al. | |
| 2016/0319790 A1 | 11/2016 | Serkan et al. | |

FOREIGN PATENT DOCUMENTS

| | | |
|---|---|---|
| EP | 2801672 A1 | 11/2014 |
| EP | 3015767 B1 | 3/2019 |

\* cited by examiner

MOUNTING CLIP TO MOUNT AN ACTUATOR UNIT TO A VALVE UNIT AND ASSEMBLY HAVING AN ACTUATOR UNIT, A VALVE UNIT AND A MOUNTING CLIP

CROSS-REFERENCE TO RELATED APPLICATIONS

This application is a U.S. National Phase patent application under 35 U.S.C. 371 of International Application No. PCT/EP2021/059381 filed Apr. 12, 2021, which claims the benefit of and priority to European Patent Application No. 20169400.7, filed on Apr. 14, 2020, each of which are incorporated herein by reference in their entireties.

FIELD

The invention relates to a mounting clip to mount an actuator unit to a valve unit. Further on, the invention relates to an assembly having an actuator unit, a valve unit and a mounting clip.

BACKGROUND

DE 10 2017 209 459 B4 discloses an assembly comprising a valve unit having a valve unit housing and an actuator unit having an actuator unit housing. A flange of the valve unit housing has through holes. A shoulder of the actuator unit housing surrounds a control terminal of the actuator unit coaxially to a control axis of the control terminal. The shoulder of the actuator unit housing has bolts which extend in the direction parallel to the control axis of the control terminal away from the shoulder and which are configured to penetrate into the through holes in the flange of the valve unit housing so that the bolts upon attachment of the actuator unit on the flange of the valve unit housing protrude through the through holes in the flange of the valve unit housing. The assembly further comprises a mounting element to fix the actuator unit on the valve unit upon attachment of the actuator unit on the flange of the valve unit housing. This mounting element is provided by a fork-shaped splint. Such a fork-shaped splint is complex in manufacturing and expensive.

U.S. Pat. No. 6,681,458 B2 discloses a mounting clip for retaining an electrical connector in a coupled engagement. This mounting clip is not suitable to replace the known fork-shaped splint used to fix an actuator unit on a valve unit upon attachment of the actuator unit on the valve unit.

U.S. Pat. No. 5,581,222 A discloses a valve unit assembly with connection by a clip. This mounting clip is not suitable to replace the known fork-shaped splint used to fix an actuator unit on a valve unit upon attachment of the actuator unit on the valve unit.

The brochure "FIREFLY FIRE CLIPS, EL266/19023, Marshall-Tufflex Ltd" shows several different fire clips also not suitable to replace the known fork-shaped splint used to fix an actuator unit on a valve unit upon attachment of the actuator unit on the valve unit. The Product Information "Fire Clip External MMT2, Marshall-Tufflex Ltd, Dec. 9, 2019" shows details of one of said fire clips.

EP 3 015 767 B1, EP 1 008 804 A2 and EP 2 801 672 A1 show other mounting elements. EP 3 015 767 B1 shows a mounting element used to mount a gas valve unit to a gas/air mixer. EP 1 008 804 A2 shows a mounting element used to mount a gas duct to gas valve unit. EP 2 801 672 A1 shows a mounting element to mount housing sections of back flow preventers. All these mounting elements are not suitable to replace the known fork-shaped splint used to fix an actuator unit on a valve unit.

A novel mounting clip is needed allowing a simple and reliable fixation of an actuator unit on a valve unit upon attachment of the actuator unit on the valve unit being easy and cheap in manufacturing.

SUMMARY

Against this background, a novel mounting clip to mount an actuator unit to a valve unit is provided.

The novel mounting clip is configured to mount an actuator unit to a valve unit, the valve unit having a valve unit housing and a flange formed at the valve unit housing, the actuator unit having an actuator unit housing and a shoulder formed at the actuator unit housing.

The novel mounting clip has first sections positioned in first level, wherein said first sections are straight and run parallel to each other within said first level, and wherein said straight sections are configured to be inserted into grooves provided at the shoulder of the actuator unit.

The novel mounting clip has a second section positioned in a second level, wherein said second section is U-shaped, and wherein said second section is configured to be inserted into a recess provided at the flange of the valve unit.

The novel mounting clip has third sections extending between each of said first sections and the second section, wherein each of said third sections has a first subsections being bent, a second subsection being bent and a third subsection being straight or angled. The first subsections of the third sections extend between the first sections and the third subsections of the third sections. The second subsections of the third sections extend between the second section and the third subsections of the third sections.

The novel mounting clip allows a simple and secure fixation of an actuator unit on a valve unit upon attachment of the actuator unit on the valve unit being easy and cheap in manufacturing.

According to a first embodiment of the mounting clip, the third subsections of the third sections are positioned in a third level, said third level being positioned between said first level and said second level, wherein the first subsections of the third sections extend between the third level and said first level, and wherein the second subsections of the third sections extend between the third level and said second level. The third level may run parallel to the second level. The third level and the second level may enclose an acute angle with first level. The second subsections of the third sections may be positioned in fourth levels running perpendicular to the third level. The first subsections of the third sections may be positioned in fifth levels, wherein the fifth levels and the fourth levels enclose an acute angle, and wherein the fifth levels converge from the first level towards the third level. The first embodiment of the mounting clip is most preferred. The same is very easy and very cheap in manufacturing.

According to a second embodiment of the mounting clip, the third subsections of the third sections are positioned in said second level offset from said second section, wherein the first subsections of the third sections extend between the first level and said second level, wherein the second subsections of the third sections are positioned in a third level. The third level and the second level may enclose an obtuse angle. The first level and the second level may enclose an acute angle.

All sections of the mounting clip are made from one monolithic metal wire. The metal wire may have a diameter in a range between 1.0 mm and 3.5 mm, preferred in a range between 1.5 mm and 3.0 mm, most preferred in a range between 2.0 mm and 2.5 mm.

The assembly having an actuator unit, a valve unit and a mounting clip is de-fined in claim 14.

BRIEF DESCRIPTION OF THE DRAWINGS

Preferred developments of the invention are provided by the dependent claims and the description which follows. Exemplary embodiments are explained in more detail on the basis of the drawing, in which:

FIG. 1 b shows an actuator unit and a valve unit being disassembled from each other;

DETAILED DESCRIPTION

Figure 1A:
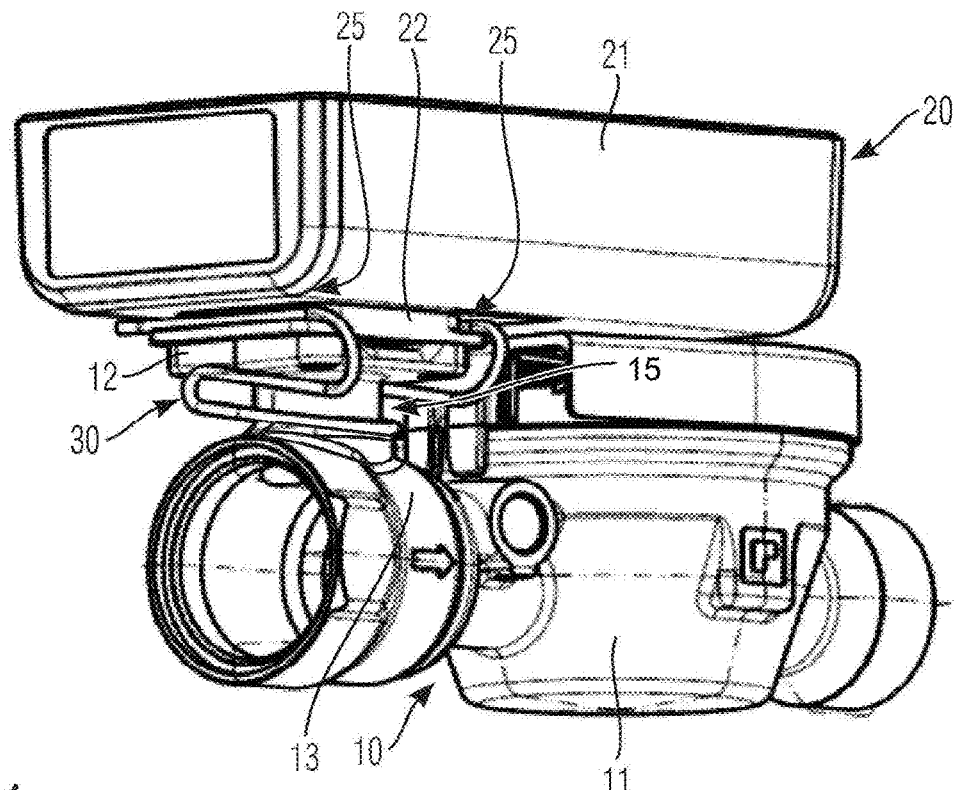
FIG. 1 a shows an assembly having an actuator unit, a valve unit and a mounting clip.
Figure 1B:
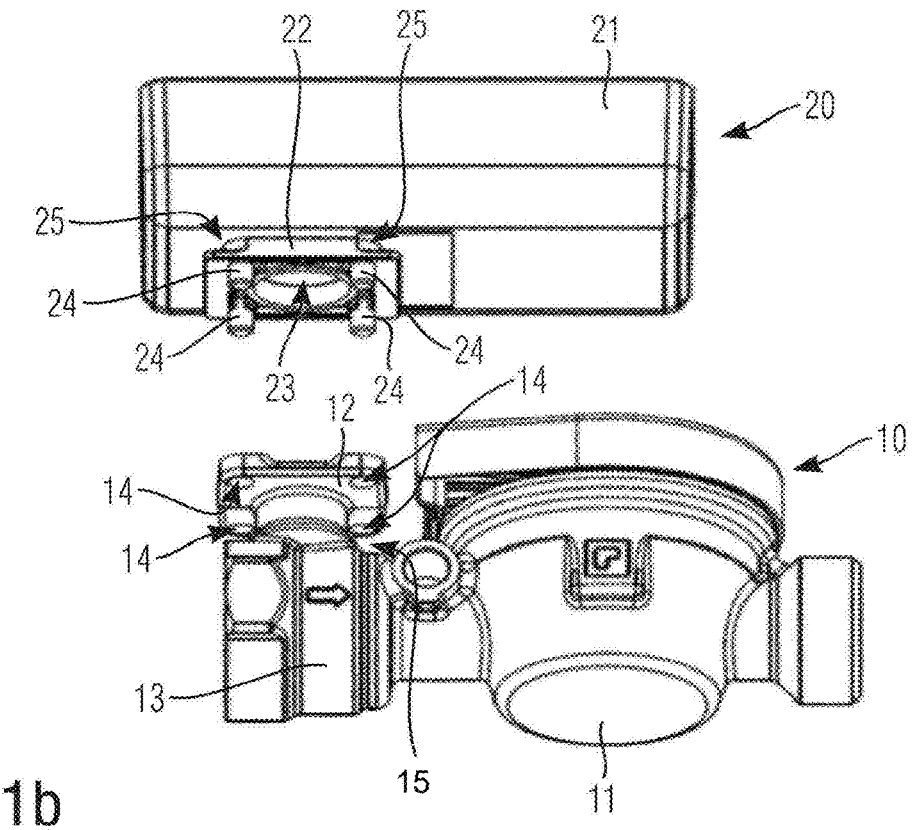
Figure 2A:
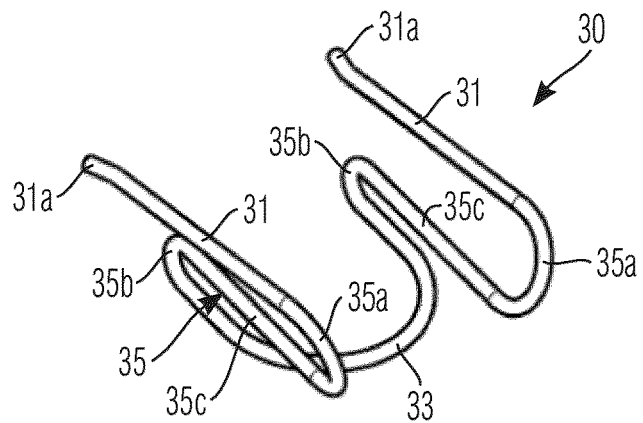
FIGS. 2a to 2e show different views of a first mounting clip.
Figure 2B:
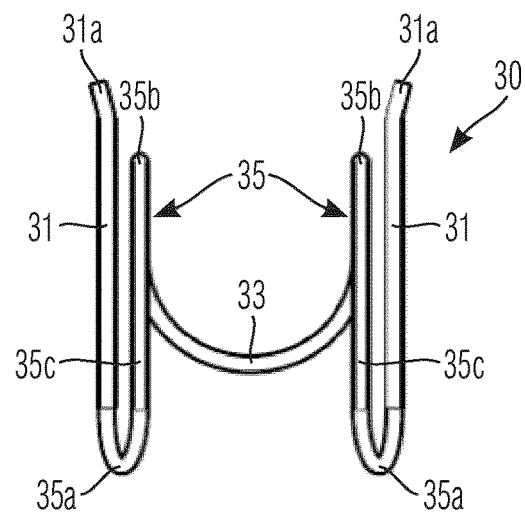
Figure 2C:
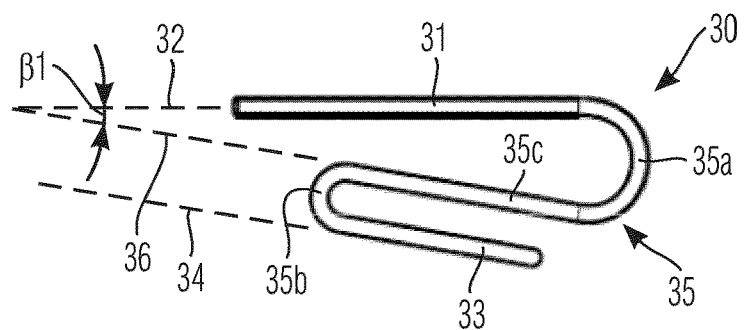
Figure 2D:
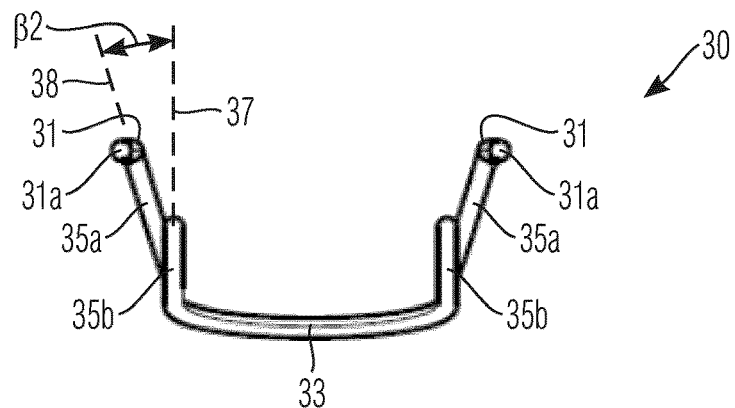
Figure 2E:
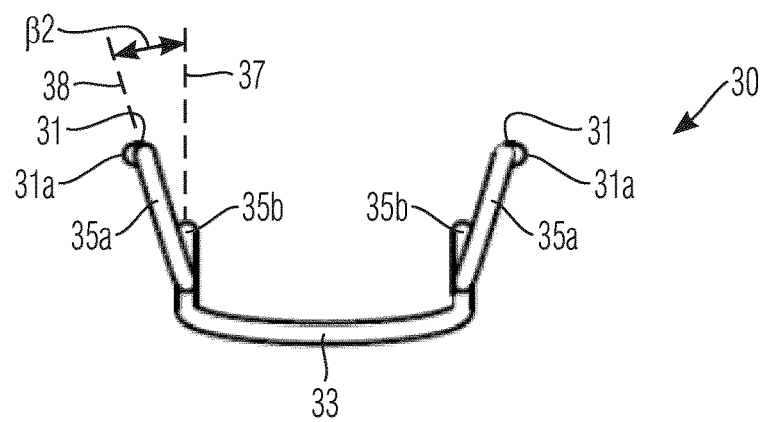
Figure 3A:
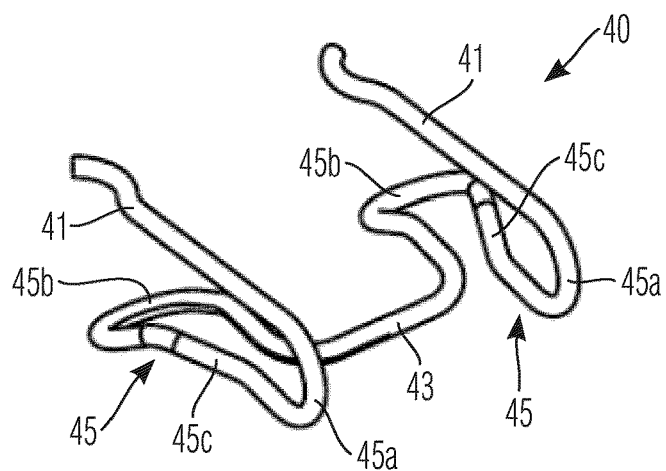
FIGS. 3a to 3e show different views of a second mounting clip.
Figure 3B:
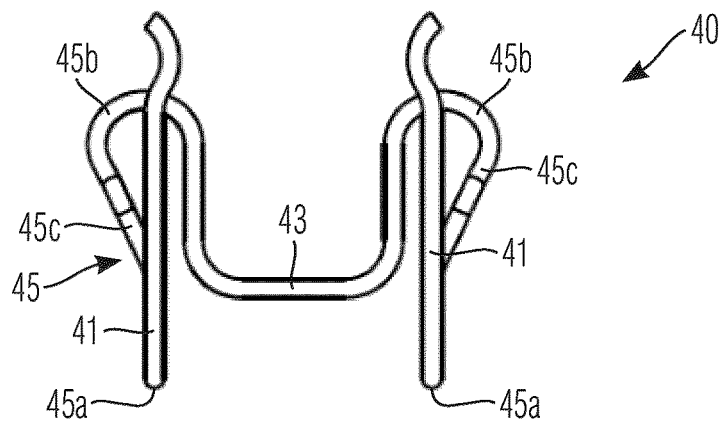
Figure 3C:
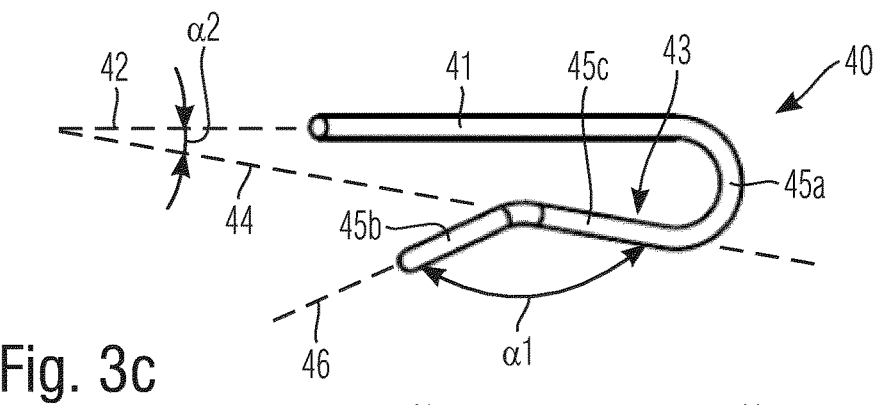
Figure 3D:
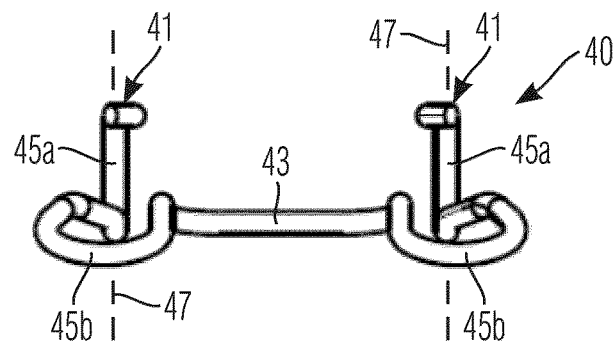
Figure 3E:
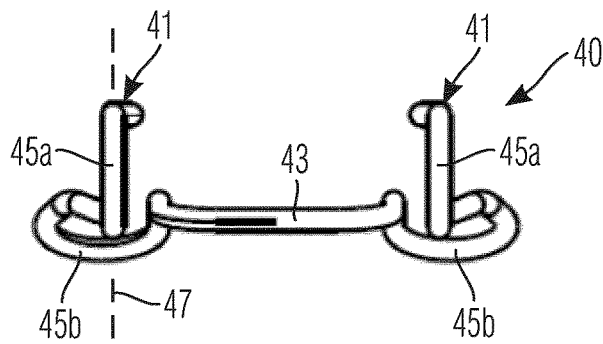

FIG. 1 shows an assembly having an actuator unit 10, a valve unit 20 and a mounting clip 30.

The valve unit 10 has a valve unit housing 11 and a flange 12 formed at the valve unit housing 11, namely at an inlet section 13 of the valve unit housing 11. The flange 12 of the valve unit housing 11 has openings 14 (see FIG. 1b).

The actuator unit 20 has an actuator unit housing 21 and a shoulder 22 formed at the actuator unit housing 21. The shoulder 22 of the actuator unit housing 21 surrounds a control terminal 23 of the actuator unit 21 coaxially to a control axis of the control terminal 23. The shoulder 22 of the actuator unit housing 21 has bolts 24 (see FIG. 1b). The bolts 24 extend in the direction parallel to the control axis of the control terminal 23 away from the shoulder 22. The bolts 24 are configured to penetrate into the openings 14 in the flange 12 of the valve unit housing 11 so that the bolts 24 upon attachment of the actuator unit 20 on the flange 12 of the valve unit 10 protrude into the openings 14 in the flange 12.

In FIG. 1 the mounting clip 30 shown in FIGS. 2a to 2e is used to fix the actuator unit 20 on the valve unit 10 upon attachment of the actuator unit 20 on the flange 12 of the valve unit housing 11.

The mounting clip 30 has first sections 31 positioned in first level 32, wherein said first sections 31 are straight and run parallel to each other within said first level 32. Said first sections 31 are configured to be inserted into grooves 25 provided at the shoulder 22 of the actuator unit 20.

The mounting clip 30 has a second section 33 positioned in a second level 34, wherein said second section 33 is U-shaped. Said second section 33 is configured to be inserted into a recess 15 provided at the flange 12 of the valve unit 11.

The mounting clip 30 has third sections 35 extending between each of said first sections 31 and the second section 33.

Each of said third sections 35 has a first subsections 35a being bent, a second subsection 35b being bent and a third subsection 35c being straight.

The first subsections 35a of the third sections 35 extend between the first sections 31 and the third subsections 35c of the third sections 35. The second subsections 35b of the third sections 35 extend between the second section 33 and the third subsections 35c of the third sections 35.

The third subsections 35c of the third sections 35 are positioned in a third level 36. Said third level 36 is positioned between said first level 32 and said second level 34. See FIG. 2c. The distance between the third level 36 and the first level 32 is larger than the distance between the third level 36 and the second level 34. A bending radius of the first subsections 35a is greater than a bending radius of the second subsections 35b.

The first subsections 35a of the third sections 35 extend between the third level 36 and said first level 32. The second subsections 35b of the third sections 35 extend between the third level 36 and said second level 34.

The third level 36 runs parallel to the second level 34. The third level 36 and the second level 34 each enclose an acute angle (31 with first level 32. The acute angle (31 may be between 2° and 20°, preferably between 5° and 15°.

The second subsections 35b of the third sections 35 are positioned in fourth levels 37 running perpendicular to the third level 36. The first subsections 35a of the third sections 35 are positioned in fifth levels 38. The fifth levels 38 and the fourth levels 37 enclose an acute angle (32. The acute angle (32 may be between 5° and 25°.

The fifth levels 38 converge from the first level 32 towards the third level 36 and towards the second level 34.

The first sections 31 being positioned in first level 32 have angled end sections 31a.

All sections 31, 33, 35 of the mounting clip 30 are made from one monolithic metal wire. The monolithic metal wire may have a diameter in a range between 1.0 and 3.5 mm, preferred in a range between 1.5 and 3.0 mm, most preferred in a range between 2.0 and 2.5 mm.

The mounting clip 40 shown in FIGS. 3a to 3e may alternatively be used to fix the actuator unit 20 to or at the valve unit 10 upon attachment of the actuator unit 20 on the flange 12 of the valve unit housing 11.

The mounting clip 40 has first sections 41 positioned in first level 42, wherein said first sections 41 are straight and run parallel to each other within said first level 42. Said first sections 41 are configured to be inserted into grooves 25 provided at the shoulder 22 of the actuator unit 20.

The mounting clip 40 has a second section 43 positioned in a second level 44, wherein said second section 43 is U-shaped. Said second section 43 is configured to be inserted into a recess 15 provided at the flange 12 of the valve unit 11.

The mounting clip 40 has third sections 45 extending between each of said first sections 41 and the second section 43.

Each of said third sections 45 has a first subsections 45a being bent, a second subsection 45b being bent and a third subsection 45c being angled.

The first subsections 45a of the third sections 45 extend between the first sections 41 and the third subsections 45c of the third sections 45.

The second subsections 45b of the third sections 45 extend between the second section 43 and the third subsections 45c of the third sections 45.

The third subsections 45c of the third sections 45 are positioned in said second level 44 offset from said second section 43. The second section 43 is positioned between the third subsections 45c of the third sections 45.

The first subsections 45a of the third sections 45 extend between the first level 42 and said second level 44. The second subsections 45b of the third sections 45 are positioned in a third level 46.

The third level 46 and the second level 44 enclose an obtuse angle a1. See FIG. 3c. The obtuse angle a1 may be between 155° and 175°.

The first level 42 and the second level 44 enclose an acute angle a2. The acute angle a2 may be between 2° and 20°, preferably between 5° and 15°.

The first subsections 45a of the third sections 45 are positioned in a fourth levels 47. The fourth levels 47 run perpendicular to the first level 42.

All sections 41, 43, 45 of the mounting clip 40 are made from one monolithic metal wire. The monolithic metal wire may have a diameter in a range between 1.0 and 3.5 mm, preferred in a range between 1.5 and 3.0 mm, most preferred in a range between 2.0 and 2.5 mm.

The invention provides a simple and reliable attachment and fixation of an actuator unit 20 and valve unit 10. The solution provided by the novel mounting clip 30, 40 is cheap, easy and reliable. The clip 30, 40 is a spring type clip with preload in assembly.

The clip 30, 40 is designed in the way that allows simple mounting and dis-mounting without a tool. The mounting and dismounting of the clip are toolless.

During the installation (pressing in) of the clip 30, 40 the preload of the clip 30, 40 provides haptic feedback to installer that end position is not reached. In moment of reaching end position the haptic feedback is provided to installer.

The force of the preload of an installed clip 30, 40 provides secure coupling of actuator unit 20 and valve unit 10.

LIST OF REFERENCE SIGNS 10 valve unit
11 valve unit housing
12 flange
13 inlet section
14 opening
15 recess
20 actuator unit
21 actuator unit housing
22 shoulder
23 control terminal
24 bolt
25 groove
30 mounting clip
31 first section
31a end section
32 first level
33 second section
34 second level
35 third section
35a first subsection
35b second subsection
35c third subsection
36 third level
37 fourth level
38 fifth level
40 mounting clip
41 first section
41a end section
42 first level
43 second section
44 second level
45 third section
45a first subsection
45b second subsection
45c third subsection
46 third level
47 fourth level

The invention claimed is:

1. A mounting clip to mount an actuator unit to a valve unit, the valve unit having a valve unit housing and a flange formed at the valve unit housing, the actuator unit having an actuator unit housing and a shoulder formed at the actuator unit housing,
the mounting clip has first sections positioned in a first level,
wherein the first sections are straight and run parallel to each other within the first level, and
wherein the first sections are configured to be inserted into grooves provided at the shoulder of the actuator unit,
the mounting clip has a second section positioned in a second level,
wherein the second section is U-shaped, and wherein the second section is configured to be inserted into a recess provided at the flange of the valve unit, the mounting clip has third sections extending between each of the first sections and the second section,
wherein each of the third sections has a first subsection being bent, a second subsection being bent, and a third subsection being straight or angled,
wherein the first subsections of the third sections extend between the first sections and the third subsections of the third sections,
wherein the second subsections of the third sections extend between the second section and the third subsections of the third sections.

2. The mounting clip as claimed in claim 1, wherein:
the third subsections of the third sections are positioned in a third level, the third level being positioned between the first level and the second level,
the first subsections of the third sections extend between the third level and the first level, and
the second subsections of the third sections extend between the third level and the second level.

3. The mounting clip as claimed in claim 2, wherein:
the third level runs parallel to the second level, the third level, and the second level each encloses an acute angle with first level.

4. The mounting clip as claimed in claim 3, wherein the acute angle is between 2° and 20°.

5. The mounting clip as claimed in claim 2, wherein the second subsections of the third sections are positioned in fourth levels running perpendicular to the third level.

6. The mounting clip as claimed in claim 5, wherein:
the first subsections of the third sections are positioned in fifth levels,
the fifth levels and the fourth levels enclose an acute angle, and
the fifth levels converge from the first level towards the third level.

7. The mounting clip as claimed in claim 1, wherein:
the third subsections of the third sections are positioned in the second level offset from the second section,
the first subsections of the third sections extend between the first level and the second level, and
the second subsections of the third sections are positioned in a third level.

8. The mounting clip as claimed in claim 7, wherein the third level and the second level enclose an obtuse angle.

9. The mounting clip as claimed in claim 8, wherein the obtuse angle is between 155° and 175°.

10. The mounting clip as claimed in claim 7, wherein the first level and the second level enclose an acute angle.

11. The mounting clip as claimed in claim 10, wherein the acute angle is between 2° and 20°.

12. The mounting clip as claimed in claim 1, wherein all of the sections and the subsections are made from one monolithic metal wire.

13. The mounting clip as claimed in claim 12, wherein the one monolithic metal wire has a diameter in a range between 1.0 and 3.5 mm.

14. The mounting clip as claimed in claim 12, wherein the one monolithic metal wire has a diameter in a range between 1.5 and 3.0 mm.

15. The mounting clip as claimed in claim 12, wherein the one monolithic metal wire has a diameter in a range between 2.0 and 2.5 mm.

16. An assembly, comprising:
a valve unit having a valve unit housing and a flange formed at the valve unit housing,
wherein the flange of the valve unit housing has openings,
an actuator unit having an actuator unit housing and a shoulder formed at the actuator unit housing,
wherein the shoulder of the actuator unit housing has bolts which extend away from the shoulder and which are configured to penetrate into the openings in the flange of the valve unit housing so that the bolts up on attachment of the actuator unit on the flange of the valve unit housing protrude into the openings in the flange of the valve unit housing, and
a mounting clip to fix the actuator unit on the valve unit upon attachment of the actuator unit on the flange of the valve unit housing,
the mounting clip comprising:
first sections positioned in a first level,
wherein the first sections are straight and run parallel to each other within the first level, and
wherein the first sections are configured to be inserted into grooves provided at the shoulder of the actuator unit,
a second section positioned in a second level,
wherein the second section is U-shaped, and wherein the second section is configured to be inserted into a recess provided at the flange of the valve unit,
third sections extending between each of the first sections and the second section,
wherein each of the third sections has a first subsection being bent, a second subsection being bent, and a third subsection being straight or angled,
wherein the first subsections of the third sections extend between the first sections and the third subsections of the third sections,
wherein the second subsections of the third sections extend between the second section and the third subsections of the third sections.

* * * * *